United States Patent [19]

Erickson

[11] Patent Number: 5,798,086
[45] Date of Patent: Aug. 25, 1998

[54] INTENSIFIED LOCALLY COCURRENT TRAY CONTACTORS

[76] Inventor: Donald C. Erickson, 1704 S. Harbor La., Annapolis, Md. 21401

[21] Appl. No.: 644,568

[22] Filed: May 10, 1996

[51] Int. Cl.$^6$ ....................................................... C10J 1/08
[52] U.S. Cl. ............................ 422/211; 261/114.1
[58] Field of Search ................................. 422/201, 211, 422/213; 261/114.1, 114.4, 114.5

[56] References Cited

U.S. PATENT DOCUMENTS

| | | | |
|---|---|---|---|
| 1,620,593 | 3/1927 | Brown | 261/114.1 |
| 2,693,350 | 11/1954 | Ragatz | 261/114.1 |
| 3,642,452 | 2/1972 | Roget et al. | 23/283 |
| 3,790,141 | 2/1974 | Champeau | 261/177 |
| 4,329,234 | 5/1982 | Cikut et al. | 210/752 |
| 4,869,851 | 9/1989 | Parker et al. | 261/114.1 |
| 4,954,294 | 9/1990 | Bannon | 261/114.1 |

FOREIGN PATENT DOCUMENTS 0743683  6/1980  Russian Federation ............ 261/114.1

Primary Examiner—Scott Kastler

[57] ABSTRACT

An intensified means of multicomponent fluid multistage vapor-liquid contact is disclosed. The contactor achieves the thermodynamic advantages of global countercurrency, the tray efficiency advantages of tray crosscurrency, and the point efficiency advantages of local cocurrency with liquid recirculation. Referring to FIG. 6, each tray has multiple compartments formed by compartment dividers 62, 63, and 64, and each compartment has a channel divider 69, 66, 67 which forms separate locally cocurrent riser channels and liquid downcomer channels.

21 Claims, 4 Drawing Sheets

INTENSIFIED LOCALLY COCURRENT TRAY CONTACTORS

TECHNICAL FIELD

The invention is directed toward adiabatic multistage vapor-liquid contactors which find use in a variety of equipment and industrial processes such as fractional distillation, absorption, stripping, mixing, and the like.

BACKGROUND

Multicomponent fluid vapor-liquid contactors of the tray or plate type have several known limitations which result in large diameter, large height, high cost, and high pressure drop. The diameter is determined by the flooding limitation, i.e., the loading. The overall height is determined by the tray efficiency and height of a tray. Tray height is related to the point efficiency and froth height, which are interrelated, and are controlled by vapor injector geometry and weir height. Tray pressure drop is the sum of the vapor injector drop plus the tray liquid head.

Vapor-liquid contactors are used in distillation columns, rectifiers, strippers, absorbers, regenerators, mixing columns, and the like.

Various approaches to overcoming the above limitations have been disclosed in the prior art. Higher point efficiencies have been achieved in spinning cone contactors. Higher loadings have been achieved using locally cocurrent trays plus separators which route the liquid to a twice lower tray (U.S. Pat. No. 4,361,469). Conventional trays have a cross-current contact pattern, and cannot be increased to the higher loading characteristic of cocurrency without flooding.

It is reported that the addition of a layer of packing between sieve trays reduces entrainment and increases tray efficiency, but without significant increase in vapor rate or loading.

It is known that conventional crosscurrent trays approach a limit of 150% tray efficiency when the liquid direction is reversed on each tray, and 200% when the liquid direction is the same on each tray. This boost in efficiency is owing to the extra boost provided by effectively having multiple horizontal stages on each vertical tray, i.e., due to concentration gradients across the tray.

What is needed, and among the objects of this invention, are apparatus and process for vapor-liquid contact which achieves simultaneously the thermodynamic advantage of globally countercurrent multistage contact, the tray efficiency advantage of tray crosscurrent contact, and the point efficiency and loading advantages of locally cocurrent liquid recirculated contact.

DISCLOSURE OF INVENTION

The above and additional useful advantages are obtained in apparatus and corresponding process for multicomponent fluid mass exchange comprised of:

a. a multiplicity of vertically stacked trays within a containment;

b. a multiplicity of channel weirs on each tray, each channel weir defining a locally cocurrent vapor-liquid upflow zone on one side of the channel weir, and a liquid downflow zone on the other side; said channel weirs having a liquid passage opening at or near the bottom for transport of liquid from the downflow zone to the cocurrent upflow zone;

c. a multiplicity of vapor passages through said trays at the bottom of said cocurrent upflow zones;

d. a level control liquid weir on each tray;

e. a passage for transport of liquid spillover from said liquid weir to the next lower tray;

f. a vapor supply and liquid withdrawal below said stack of trays; and g. a liquid supply and vapor withdrawal above said stack of trays.

Yet further advantages are obtained by dividing each tray into a plurality of compartments by compartment dividers, each compartment containing at least one channel weir (channel divider). The compartmentalization reduces the horizontal mixing of both the liquid and the vapor, resulting in larger concentration gradients and hence higher tray efficiencies for a given point efficiency.

More intensified vapor-liquid contact, and hence higher point efficiency or lower froth height, can be obtained by placing enhanced contact media in the cocurrent upflow channels. The required amount of media is relatively very small, since most of the tray volume is empty space, yet all the fluid traverses the small upflow channels, which are highly loaded. The media can also be catalytically active, to support chemically reactive distillation. Thus maximum utilization of a very small amount of catalyst is achieved.

The tray loading can be further increased, and/or tray height further decreased by providing apparatus for vapor-liquid separation above the channel weirs. Thus the vapor-liquid separation is accelerated and made more effective compared to simply relying on open space separation. It is important that the liquid drainage from the separator be directed to the downflow zone, as otherwise it can be re-entrained in the cocurrent upflow.

Each tray is fitted with a level control liquid weir, much like conventional trays, and the weir overflow is routed to the next lower tray, again similar to conventional practice. It is frequently preferred to route the overflow liquid to the same comparative location on each succeeding tray this allows the tray efficiency to approach 200%. Liquid overflow paths are simpler when the liquid flow direction is different on adjacent trays, but then the tray efficiency only approaches 150%.

In order to ensure good liquid renewal on all active parts of the tray, the liquid transport openings in the respective compartment dividers can be staggered so as to ensure a tortuous liquid flowpath across the entire tray.

The relative amount of liquid recirculation within a compartment compared to net liquid transport through a compartment can be controlled by varying the area of the liquid transport openings at the bottom of the compartment dividers relative to the area of the liquid recirculation openings at the bottom of the channel dividers.

The trays may be circular, rectangular, or other known shapes. Diameters in the range of 40 to 10,000 mm are contemplated. The vapor passages through each tray into the bottom of the cocurrent upflow zones may be orifices, slots, tubes, valves, and the like. Hole diameters in the range of 0.5 mm to 20 mm are contemplated, and even larger for valved openings. Tray heights between 50 and 1000 mm are contemplated. Spacing between compartment dividers and channel dividers in the range of 5 to 100 mm is contemplated. Flooding limits are anticipated to be between 10% and 300% higher than for conventional sieve trays, dependent on vapor-liquid separator efficiency.

Thus a multistage countercurrent vapor-liquid contactor has been disclosed which provides intensified performance both in regard to loading and tray efficiency. The remaining disclosure will make evident the simplicity of construction.

BEST MODE FOR CARRYING OUT THE INVENTION

Figure 1:
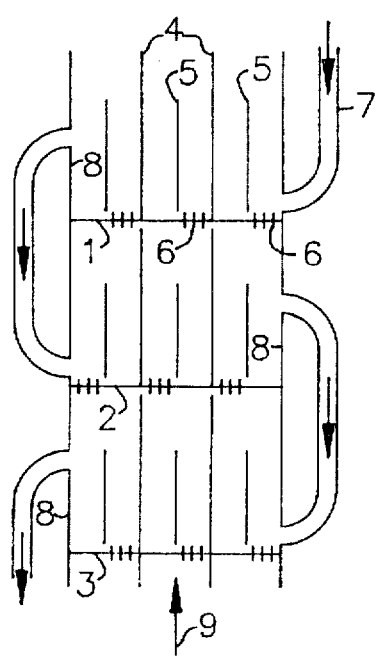
FIG. 1 is a stylized cross-sectional front view of a central section of a column fitted with plates having rectilinear locally cocurrent compartments.

Referring to FIG. 1, three plates are illustrated (1, 2, 3) in a cross-section of a central section of a vertical stack of plate contactors. Each tray is divided into three compartments by compartment dividers 4. Each compartment is divided into locally cocurrent riser channels and downcomer channels by channel dividers 5. Vapor injection passages 6 are located under each riser channel. Liquid is supplied via port 7, and liquid spills over weirs 8 to drain by gravity to the next lower plate, and finally to exit below the bottom plate. Vapor enters from below at 9, and exits from above the top plate.

Figure 2:
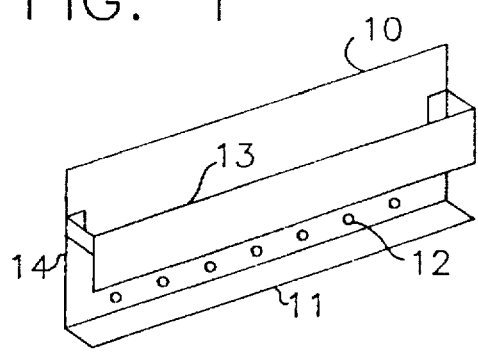
FIG. 2 shows the basic building blocks of the superstructure attached to each plate.

FIG. 2 illustrates the structure which is attached to each plate so as to form the compartments. Compartment divider 10 is affixed to the plate by any convenient means, e.g., flange 11, and has liquid passage holes 12 in it. Channel divider 13 can be suspended at the proper height and spacing via supports 14, leaving adequate spacing at the bottom for passage of the recirculating liquid from the downcomer channel to the riser channel.

Figure 3:
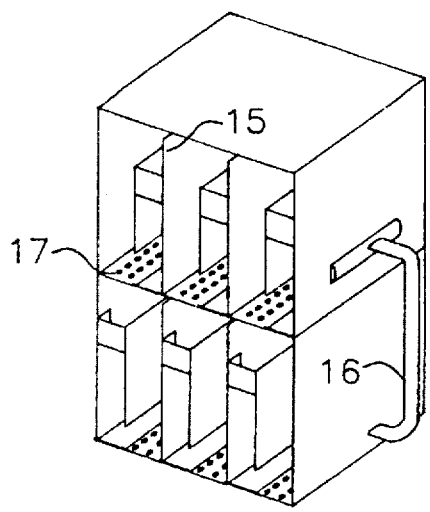
FIG. 3 illustrates two vertical compartments having external pipe liquid downcomers.

FIG. 3 illustrates two vertically stacked rectangular trays, where each tray is comprised of three of the FIG. 2 building blocks 15. External plate liquid downcomer 16 is also provided. Numerous orifices 17 are provided through each plate under the riser channels.

Figure 4:
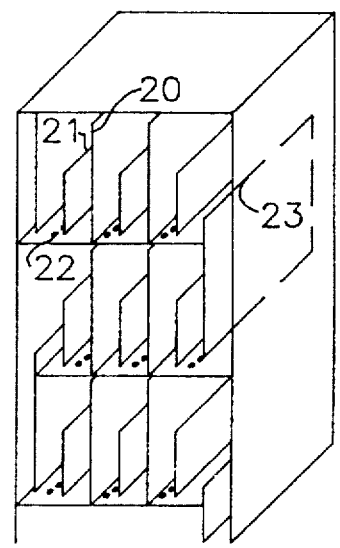
FIG. 4 illustrates the rectilinear configuration in a rectangular pressure vessel where the plate liquid downcomers are internal.

FIG. 4 illustrates three vertically stacked rectangular trays, in a configuration in which the tray liquid downcomers are located internally, and the liquid flow direction is opposite on each succeeding tray. Each tray is comprised of compartment dividers 20, channel dividers 21, orifices 22, and weir 23, which transports spillover liquid to below the froth level on the next lower tray.

Figure 5:
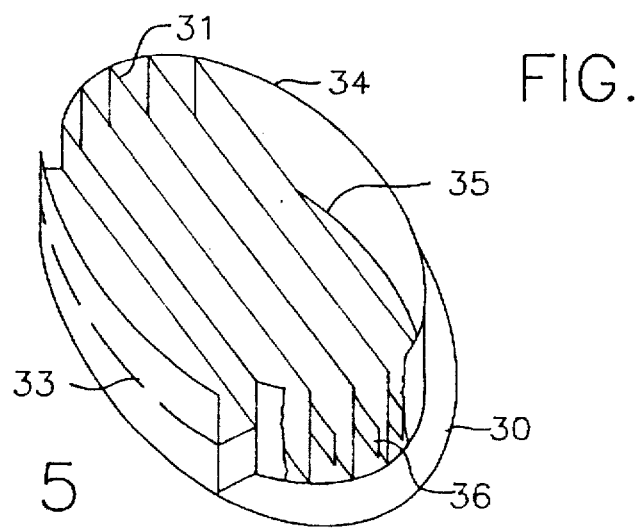
FIG. 5 illustrates the rectilinear locally cocurrent compartment configuration in a cylindrical pressure vessel, including internal plate liquid downcomers which accomplish the same liquid flow direction on each plate.

FIG. 5 illustrates a single circular tray 30 having rectilinear compartment divider building blocks 31, plus an internal tray liquid downcomer which causes the liquid to flow the same direction on each tray. Liquid spilling over the weir of the tray above falls onto shelf 33, then travels circumferentially outside wall 34, and finally enters the active contact zone under edge 35. Note also channel dividers 36.

Figure 6:
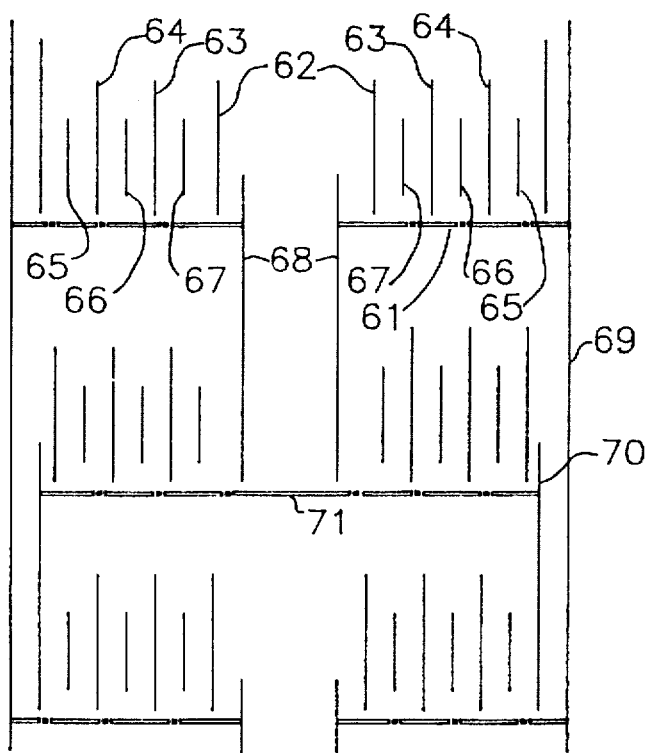
FIGS. 6 through 9 illustrate construction details for the curvilinear locally cocurrent compartment configuration.

FIG. 6 is a stylized cutaway elevation cross-section of three circular plates from a vertical plate contactor where each plate is fitted with superstructure to form a sequence of horizontal compartments, each compartment comprised of a locally cocurrent upflow of vapor and liquid, a liquid downcomer, and a vapor-liquid separation space at the top of each compartment. In particular, plate 61 has curvilinear compartment dividers 62, 63, and 64; curvilinear channel dividers 65, 66, and 67; and weir 68, which is also the liquid downcomer to the next lower tray. Cylindrical pressure vessel 69 encloses all the trays. The liquid flow direction is opposite on each tray weir 70 of tray 71 is located at the periphery of the tray, whereas weir 68 is located at the center of tray 61. Orifices or slots 72 are in each tray below the riser channels.

Figure 7:
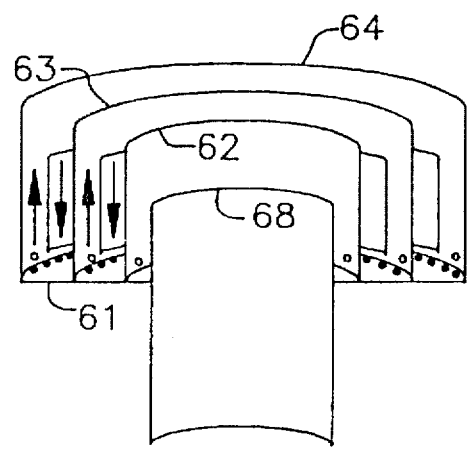

FIG. 7 is a perspective view of tray 61 plus its associated curvilinear superstructure.

Figure 8:
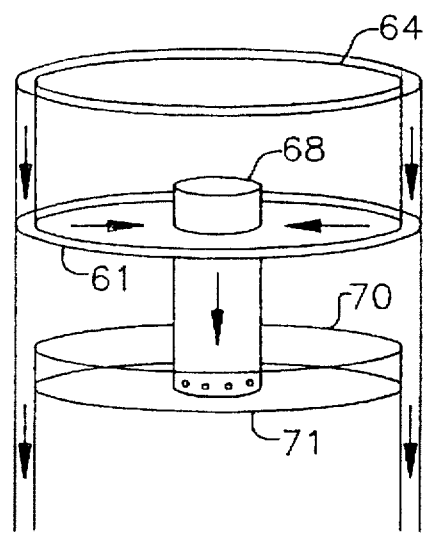

FIG. 8 illustrates the liquid flowpaths of the FIG. 6 design, with several components removed for clarity, and others (e.g., divider 64 and weir 70) made of transparent material to allow viewing.

Figure 9:
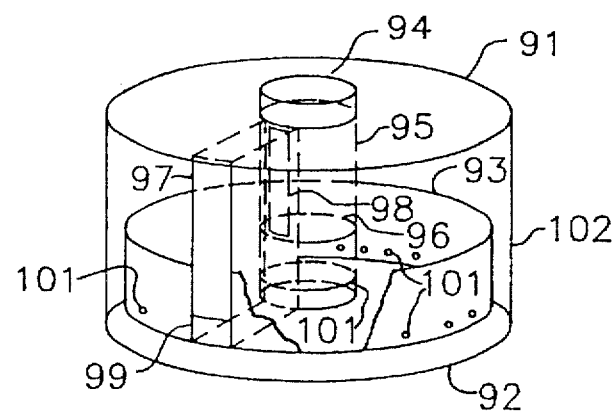

FIG. 9 illustrates two circular trays 91 and 92 adapted for curvilinear locally cocurrent superstructure (not present except for divider 93), and showing an internal liquid downcomer arrangement which accomplishes same direction liquid flow on each tray. Weir 94 is part of cylinder 95 having closed bottom 96. Spillover liquid enters liquid duct 97 through opening 98. The only exit from duct 98 is opening 99, from whence liquid travels circumferentially around divider 93 and then travels once again toward the center weir 100 via any of the liquid passage holes 101. Holes 101 may be grouped more toward the opposite side from opening 99, to ensure more even passage of liquid across all active zones of the tray. Pressure vessel 102 encloses the trays.

For trays such as FIG. 9 having same direction liquid flow on each tray, it is beneficial to keep the vapor largely confined to the same respective compartment on each tray. This is done by extending the compartment dividers up to the bottom of the tray above.

Figure 10:
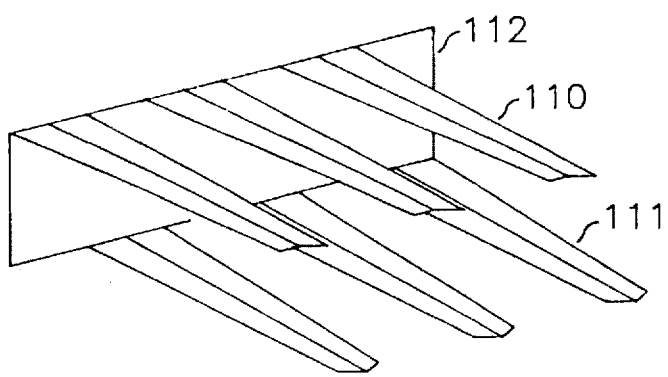
Figure 11:
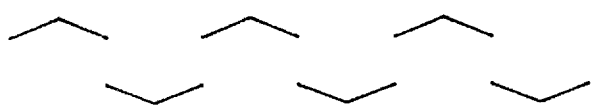
Figure 12:
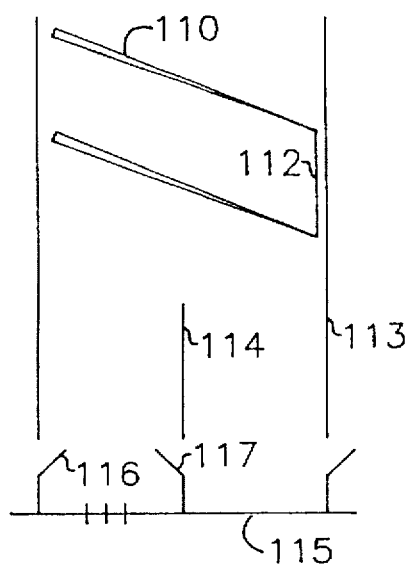
Figure 14:
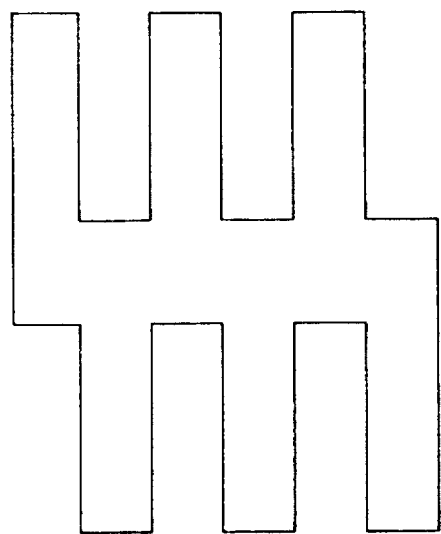

Vapor-liquid separation occurs in the space above each channel divider. The onset of entrainment flooding can be materially extended to higher vapor rates by placing mechanical vapor-liquid separators in that space. The separators cause a change in flow direction of the vapor, plus impingement and draining of the liquid which is more resistant to changing direction. It is important that the liquid have a drainage path to the downcomer channel and its lower vapor velocity, as otherwise it can be reentrained. FIG. 10 illustrates one possible configuration of mechanical vapor-liquid separator. Upper fingers 110 and lower fingers 1 1 1 are bent at an angle from backing plate 112. FIG. 11 illustrates the geometry of the ends of the fingers, and FIG. 14 is the shape of the starting piece of sheet metal before bending. FIG. 12 illustrates this separator in place in a compartment backing plate 112 is attached to compartment divider 113 so as to be suspended above channel divider 114, all mounted on plate 115. Note the drainage angle of fingers 110. Note also the optional use of louvers 1116 and 117 in lieu of gaps or holes as the respective liquid transport and liquid recirculation passages.

Figure 13:

FIG. 13 illustrates another possible geometry for the fingers.

Figure 15:
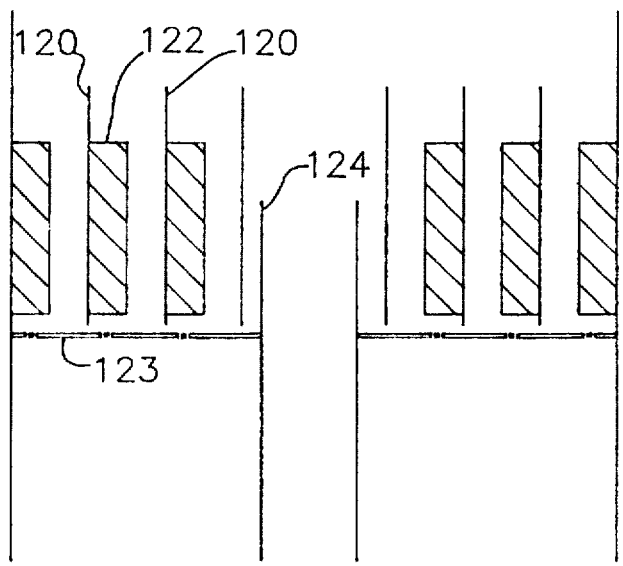
FIGS. 10, 11, 12, 13, 14 and 15 illustrate mechanical vapor-liquid separators which can be mounted above the channel dividers.

FIG. 15 illustrates the incorporation of enhanced contact media 122 in the riser channels between channel divider 121 and compartment divider 120 for tray 123, with liquid weir 124.

I claim:

1. An adiabatic vapor-liquid contactor comprised of:
   a multiplicity of vertically stacked trays; each tray comprised of
   a. a liquid entrance;
   b. a liquid exit; and
   c. a multiplicity of locally cocurrent liquid-recirculating compartments between said entry and exit; each compartment comprised of:
      i. a compartment divider ii. a channel divider with a liquid recirculation opening at the bottom which divides the compartment into a riser channel and a downcomer channel;
iii. vapor injection passages through the tray at the bottom of each riser channel, and
iv. a liquid transport opening in the bottom portion of said compartment divider.

2. The contactor according to claim 1 additionally comprised of a fluid communication path from the liquid exit of each tray to the liquid entrance of the next lower tray.

3. The contactor according to claim 2 additionally comprised of a vapor-liquid separation space above each channel divider, which communicates with the vapor injection passages of the corresponding compartment of the next higher tray.

4. The contactor according to claim 3 wherein said vapor injectors are orifices having diameter in the range of 0.5 to 20 mm, and said trays are between 40 mm and 8000 mm wide.

5. The contactor according to claim 3 additionally comprised of vapor pressure equalization openings at or near the top of said compartment dividers.

6. The contactor according to claim 3 wherein the liquid entrances and exits of all trays are in the same respective locations.

7. The contactor according to claim 3 wherein the locations of the liquid entrances and liquid exits alternate with each successive tray.

8. The contactor according to claim 3 additionally comprised of a vapor-liquid separation apparatus within said vapor-liquid separation space.

9. The contactor according to claim 8 wherein said apparatus is comprised of chevroned sheet media adapted for liquid drainage to said downcomer channel.

10. The apparatus according to claim 5 wherein said liquid transport openings are staggered so as to provide a tortuous liquid flowpath across said tray.

11. The apparatus according to claim 2 additionally comprised of enhanced vapor-liquid contact media within said riser channels.

12. The apparatus according to claim 11 wherein said contact media is comprised of a catalyst.

13. A plurality of vertically stacked vapor-liquid contact trays for use as at least one of the rectifying section and the stripping section of a fractional distillation column comprised of:
   a) a plurality of risers and downcomers on each tray, each riser in liquid communication at the top with only one downcomer, and in liquid communication at the bottom with at least two downcomers; and
   b) a path for liquid across each tray comprised of sequential cocurrent upflow in each riser.

14. The apparatus according to claim 13 wherein said liquid flowpath is in the same direction on each tray, and additionally comprised of vapor-liquid separation media above each of said risers.

15. An apparatus for multicomponent fluid mass exchange comprised of:
   a. a multiplicity of vertically stacked trays within a containment;
   b. a multiplicity of channel weirs on each tray, each channel weir defining a locally cocurrent vapor-liquid upflow zone on one side of the channel weir, and a liquid downflow zone on the other side; said channel weirs having a liquid passage opening at or near the bottom for transport of liquid from the downflow zone to the cocurrent upflow zone;
   c. a multiplicity of vapor injection passages through said trays at the bottom of said cocurrent upflow zones;
   d. a level control liquid weir on each tray;
   e. a passage for transport of liquid spillover from said liquid weir to the next lower tray;
   f. a vapor supply and liquid withdrawal below said stack of trays; and
   g. a liquid supply and vapor withdrawal above said stack of trays.

16. The apparatus according to claim 15 additionally comprised of a vapor-liquid separator above said channel weirs which drains separated liquid to said downflow zones.

17. The apparatus according to claim 15 additionally comprised of compartment dividers between said channel weirs, said compartment dividers extending to the bottom of the tray above.

18. A vapor-liquid contact process comprising:
   a. passing vapor sequentially upward through a multiplicity of trays, through vapor passage openings in each tray;
   b. passing liquid horizontally across each tray and then downward to the next lower tray;
   c. controlling the liquid level on each tray;
   d. subjecting the horizontally flowing liquid to an alternating sequence of a plurality of vapor-liquid cocurrent risings and liquid downflowings; and
   e. recirculating liquid on each tray.

19. The process according to claim 18 additionally comprising confining the upflowing vapor to the same region of each tray; and flowing the liquid in the same direction across each tray.

20. The process according to claim 18 additionally comprising flowing the liquid in a tortuous horizontal path across each tray.

21. The process according to claim 18 additionally comprising enhancing the vapor-liquid contacting in said cocurrent risings.

* * * * *